(12) United States Patent
Shinn et al.

(10) Patent No.: US 8,373,650 B2
(45) Date of Patent: Feb. 12, 2013

(54) FLEXIBLE ELECTROPHORETIC DISPLAY AND METHOD FOR MANUFACTURING THE SAME

(75) Inventors: Ted-Hong Shinn, Hsinchu (TW); Yi-Ching Wang, Hsinchu (TW); Hsiang-Tang Wang, Hsinchu (TW); Chi-Ming Wu, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 788 days.

(21) Appl. No.: 12/115,665

(22) Filed: May 6, 2008

(65) Prior Publication Data

US 2009/0184919 A1    Jul. 23, 2009

(30) Foreign Application Priority Data

Jan. 21, 2008   (TW) ................................ 97102270 A

(51) Int. Cl.
*G09G 3/34* (2006.01)
(52) U.S. Cl. .................... 345/107; 349/160; 359/296
(58) Field of Classification Search .................. 345/107, 345/108; 359/290, 296, 665; 430/37, 38, 430/19, 60; 257/59
See application file for complete search history.

(56) References Cited

U.S. PATENT DOCUMENTS

| | | | | |
|---|---|---|---|---|
| 6,774,884 | B2 * | 8/2004 | Shimoda et al. | 345/107 |
| 6,831,771 | B2 * | 12/2004 | Ho et al. | 359/296 |
| 6,922,276 | B2 * | 7/2005 | Zhang et al. | 359/296 |
| 7,579,224 | B2 * | 8/2009 | Kuwabara et al. | 438/151 |
| 7,835,063 | B2 * | 11/2010 | Kanbayashi | 359/296 |
| 2003/0222842 | A1 * | 12/2003 | Yuasa | 345/107 |
| 2006/0163743 | A1 | 7/2006 | Kuwabara et al. | |
| 2007/0159681 | A1 * | 7/2007 | Yamamoto | 359/296 |
| 2007/0177248 | A1 | 8/2007 | Kanbayashi | |

FOREIGN PATENT DOCUMENTS

| | | | |
|---|---|---|---|
| CN | 1841138 A | * | 1/2006 |
| CN | 1841138 A | | 10/2006 |

OTHER PUBLICATIONS

Office Action From Taiwan Patent Office.

* cited by examiner

*Primary Examiner* — William Boddie
*Assistant Examiner* — Towfiq Elahi
(74) *Attorney, Agent, or Firm* — Chun-Ming Shih

(57) ABSTRACT

A flexible electrophoretic display includes a backside plate, a display structure and a side reinforcement. The backside plate has a cover area. The display structure is arranged on the backside plate and a surface thereof facing toward the backside plate has an area less than the cover area of the backside plate. The side reinforcement is arranged in juxtaposition with the display structure and on the backside plate. The present invention also provides a method for manufacturing a flexible electrophoretic display.

15 Claims, 3 Drawing Sheets

FLEXIBLE ELECTROPHORETIC DISPLAY AND METHOD FOR MANUFACTURING THE SAME

BACKGROUND

The invention is related to a reflective display apparatus, especially to a method and a device for manufacturing an electrophoretic display.

An electrophoretic display (EPD) is a reflective display apparatus based on utilizing electrophoretic effect of electrified particles dispersed in a dielectric solvent. Currently, an electrophoretic display includes a glass substrate, a transparent protection layer opposite to the glass substrate with an interval, and an electrophoretic layer between the glass substrate and the transparent protection layer. The electrophoretic display is divided into passive matrix drive type and active matrix drive type by driving mode. For a passive matrix drive type electrophoretic display, it is necessary to dispose row electrodes and transparent column electrodes on the glass substrate and transparent protection layer. Correspondingly, for an active matrix drive type electrophoretic display, a TFT matrix and a pixel electrode and a transparent plate electrode without pattern are needed to be disposed on the glass substrate and the transparent protection layer, respectively.

Along with a widely use of the electrophoretic display and mostly used on portable devices, it becomes more important to design light-weight and thinner electrophoretic displays. At the present time, a soft electrophoretic display using a flexible plate to replace the glass substrate is respected to be an apparatus which can own all virtues described above and will become primary products of the market in future. However, how to improve the manufacturing yield and keep preferable reliability as much should be solved desirously.

BRIEF SUMMARY

The present invention is directed to provide a flexible electrophoretic display which can increase the manufacturing yield and improve the electrophoretic display reliability to achieve product commerce.

The present invention is directed to provide a method for manufacturing a flexible electrophoretic display which can increase the manufacturing yield and improve the electrophoretic display reliability to achieve product commerce.

According to an embodiment of the present invention, a flexible electrophoretic display includes:
  a backside plate including a cover area;
  a display structure disposed on the backside plate, and a surface thereof facing the backside plate with an area less than the cover area; and
  a side reinforcement disposed on the backside plate to be arranged in juxtaposition with the display structure.

The flexible electrophoretic display further includes a top cover and a bottom cover, and the top cover is disposed on the display structure and the side reinforcement, including an opening to expose the display area of the display structure, and the bottom cover is disposed beneath backside plate.

According to another embodiment of the present invention, a method for manufacturing a flexible electrophoretic display includes steps:
  providing a display structure;
  providing a backside plate disposed on a bottom surface of the display structure, and the backside plate having a cover area larger than an area of the bottom surface; and
  providing a side reinforcement in juxtaposition with the display structure disposed on the backside plate.

The method further includes:
  providing a top cover disposed on the display structure and the side reinforcement, and the top cover having an opening to expose a display area of the display structure; and
  providing a bottom cover disposed beneath the backside plate.

According to the embodiments of the invention, the larger backside plate on one side of the display structure and the side reinforcement disposed on the other side of the display structure are used to protect the side surface of the display structure, which can improve the electrophoretic display reliability to achieve product commerce.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
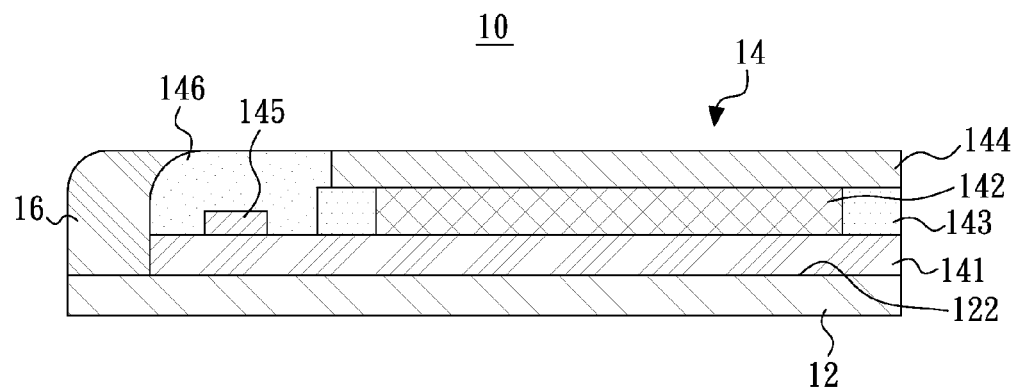
FIG. 1 is a cross sectional, schematic view of a flexible electrophoretic display according to an embodiment of the present invention.

Referring to FIG. 1, a flexible electrophoretic display 10 includes a backside plate 12, a display structure 14 and a side reinforcement 16.

The backside plate 12 includes a surface 122 with a cover area. The backside plate 12 is flexible and the material of it can be polyethylene terephthalate (PET), polystyrene (PS), or polycarbonate (PC).

The display structure 14 is disposed on the cover area of the backside plate 12, including a surface facing to the backside plate 12. The surface of the display structure 14 has an area less than the cover area. Preferably, an interval between the display structure 14 and the backside plate 12 is in a range of 0.1 mm to 1 mm.

Illuminated in detail, the display structure 14 includes a flexible plate 141, an electrophoretic layer 142, an edge protection member 143, and a transparent protection layer 144. The flexible plate 141 is disposed on the backside plate 12 to contain the required circuits and a first driving electrode (not shown). The electrophoretic layer 142 is disposed on the flexible plate 141. The electrophoretic layer 142 includes a dielectric solvent and electriferous particles dispersed in the dielectric solvent. The edge protection member 143 is disposed on the flexible plate 141 to surround the electrophoretic layer 142. The material of the edge protection member 143 can be resin material, such as Phenoxy Resin. The transparent protection layer 144 is disposed on the electrophoretic layer 142 and the edge protection member 143, including a second driving electrode (not shown). The second driving electrode is a transparent electrode, such as an Indium Tin Oxide (ITO) electrode.

Illuminated in detail, when a passive matrix drive type flexible electrophoretic display 10 is manufactured, the first driving electrode on the flexible plate 141 and the second driving electrode on the transparent protection layer 144 are row electrode and transparent column electrode, respectively.

On the contrary, to an active matrix drive type flexible electrophoretic display 10, the first driving electrode on the flexible plate 141 and the second driving electrode on the transparent protection layer 144 are pixel electrode and transparent plate electrode without pattern, respectively, and an active device matrix, such as a thin film transistor (TFT) matrix, is arranged on the flexible plate 141 to electrically connect to the pixel electrode.

Further, the display structure 14 includes at least one driving integrated circuit (IC) 145 which includes at least one gate integrated circuit and one source integrated circuit and an edge reinforcement member 146. The driving IC 145 and the electrophoretic layer 142 are disposed on the flexible plate 141 to be arranged in juxtaposition and electrically connect to the circuits and the first driving electrode on the flexible plate 141. The driving IC 145 can be a chip on glass (COG) module. The edge reinforcement member 146 covers the driving IC 145 and connects to the transparent protection layer 144 to protect the driving IC 145. The material of the edge reinforcement member 146 can be plastic material, such as UV polymeric gel, silica gel, or polyurethane (PU). Of course, the driving IC 145 is not limited to be disposed on the flexible plate 141, and also can be a driving control module independent to the display structure 14.

The side reinforcement 16 in juxtaposition with the display structure 14 are disposed on the backside plate 12. As shown in FIG. 1, the side reinforcement 16 connects to the edge reinforcement member 146 of the display structure 14. The material of the side reinforcement 16 can be plastic material, such as UV polymeric gel, silica gel, or polyurethane (PU). Preferably, the side reinforcement 16 has a Young's modulus larger than that of the edge reinforcement member 146 to enhance intensity of the flexible electrophoretic display 10 and avoid being damaged.

Figure 2:
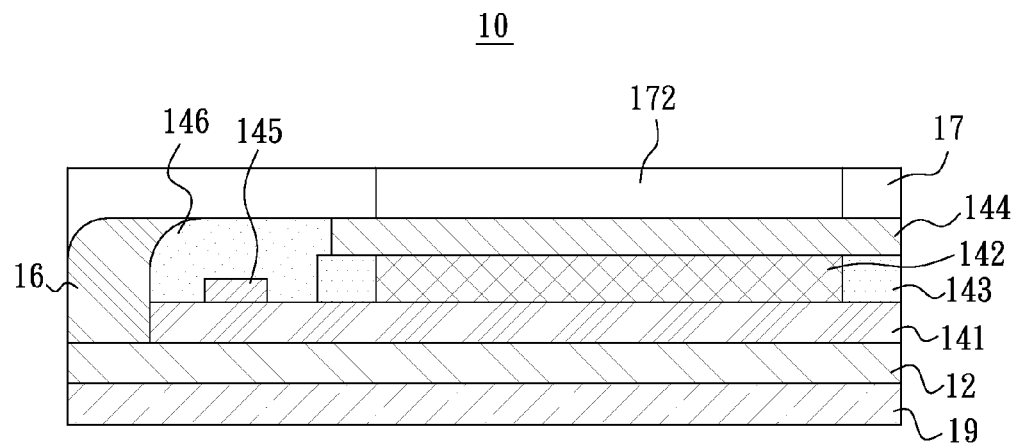
FIG. 2 is a cross sectional, schematic view of a flexible electrophoretic display according to another embodiment.

As shown in FIG. 2, the flexible electrophoretic display 10 further includes a top cover 17 and a bottom cover 19 to enhance the total intensity of the flexible electrophoretic display 10. The top cover 17 is disposed on display structure 14 and the side reinforcement 16, including an opening 172 to expose the display area of the display structure 14 (not shown). The bottom cover 19 is disposed beneath the backside plate 12. The top cover 17 and the bottom cover 19 are flexible and made of photo resistance material.

Figure 3:
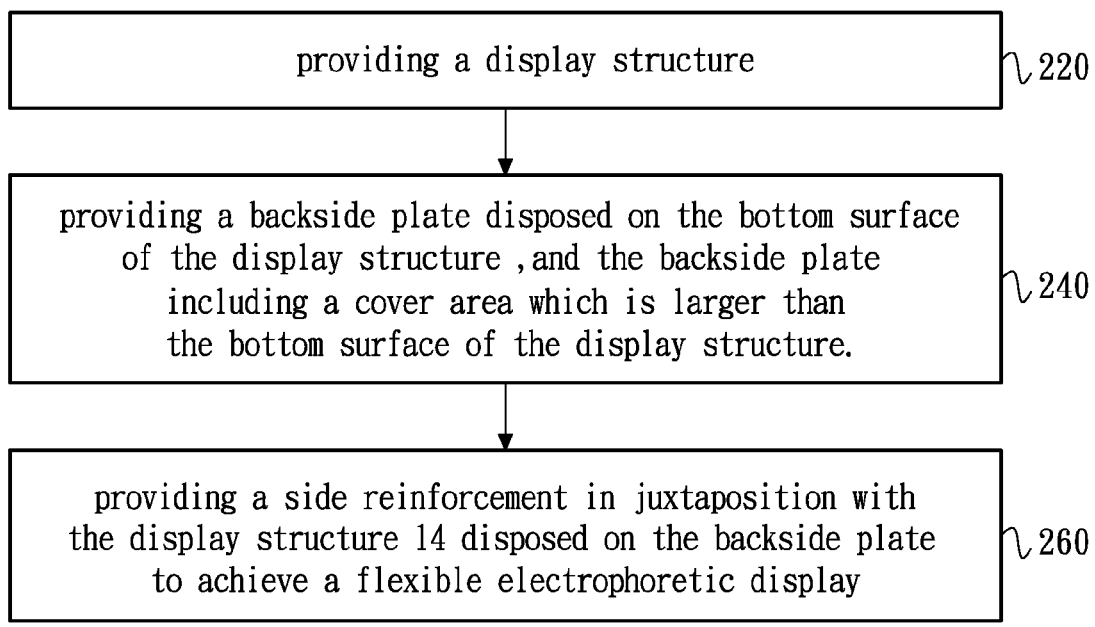
FIG. 3 is a flow chart of a method for manufacturing a flexible electrophoretic display according to an embodiment of the present invention.
Figure 4:
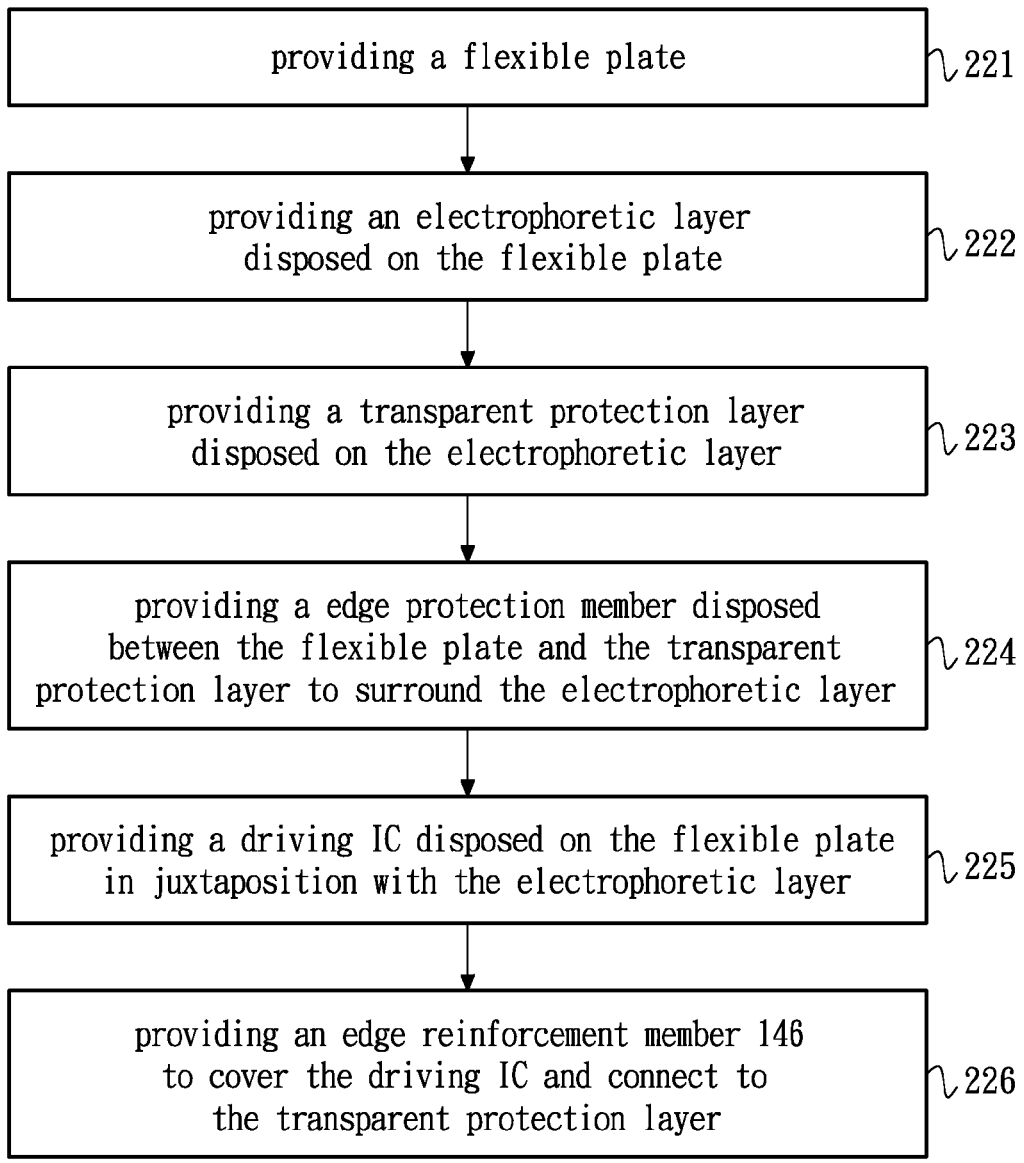
FIG. 4 is a flow chart of sub-steps of the method of FIG. 3.

Referring to FIG. 3 and FIG. 4, a method for manufacturing a flexible electrophoretic display 10 includes following step 220 to step 260:

step 220: providing a display structure 14 of FIG. 4. The step 220 may further includes the following step 221 to step 226;

step 221: providing a flexible plate 141;

step 222: providing an electrophoretic layer 142 disposed on the flexible plate 141;

step 223: providing a transparent protection layer 144 disposed on the electrophoretic layer 142;

step 224: providing a edge protection member 143 disposed between the flexible plate 141 and the transparent protection layer 144 to surround the electrophoretic layer 142;

step 225: providing a driving IC 145 disposed on the flexible plate 141 in juxtaposition with the electrophoretic layer 142; and step 226: providing an edge reinforcement member 146 to cover the driving IC 145 and connect to the transparent protection layer 144;

step 240: providing a backside plate 12 disposed on the bottom surface of the display structure 14, and the backside plate 12 including a cover area which is larger than the bottom surface of the display structure 14.

step 260: providing a side reinforcement 16 in juxtaposition with the display structure 14 disposed on the backside plate 12 to achieve a flexible electrophoretic display 10.

For further enhancing the total intensity of the flexible electrophoretic display 10, the method may include steps (not shown in figures): providing a top cover 17 disposed on the display structure 14 and the side reinforcement 16, and the top cover 17 including an opening 172 to expose a display area of the display structure 14; and providing a bottom cover 19 disposed beneath the backside plate 12.

According to the present embodiments, the backside plate 12 on disposed one side of the display structure 14 and the side reinforcement 16 disposed on the other side of the display structure 14 are used to protect the side surface and avoid the layers of the display structure 14 from peeling off, which can improve the electrophoretic display reliability to achieve product commerce. The top cover and the bottom cover can enhance the total strength of the flexible electrophoretic display.

What is claimed is:

1. A flexible electrophoretic display comprising:
   a backside plate having a surface with a cover area;
   a display structure disposed on and connected with the cover area of the surface of the backside plate, a surface thereof facing the backside plate with an area less than the cover area; and
   a side reinforcement made of a material different from that of the backside plate, separately formed with respect to the backside plate, directly disposed on and connected with the surface of the backside plate to be arranged in juxtaposition with the display structure and directly connected with a side of the display structure;
   wherein the display structure comprises:
   a flexible plate disposed on the surface of the backside plate;
   an electrophoretic layer disposed on a surface of the flexible plate;
   an edge protection member disposed on the surface of the flexible plate, surrounding the electrophoretic layer and directly connected with one side of the electrophoretic layer; and
   an edge reinforcement member disposed on and directly connected with the flexible plate, and directly connected with a side of the electrophoretic layer and the edge protection member.

2. The flexible electrophoretic display according to claim 1, wherein the display structure further comprises:
   a transparent protection layer disposed on the electrophoretic layer and the edge protection member.

3. The flexible electrophoretic display according to claim 2, wherein the display structure further comprises a driving integrated circuit (IC), the driving IC arranged in juxtaposition with the electrophoretic layer is disposed on the flexible plate, the edge reinforcement member covers the driving IC and connects to the transparent protection layer and the edge protection member, and the side reinforcement directly connects with the edge reinforcement member and the flexible plate.

4. The flexible electrophoretic display according to claim 3, wherein the driving IC is a chip on glass (COG) module.

5. The flexible electrophoretic display according to claim 1, wherein the side reinforcement has a Young's modulus larger than that of the edge reinforcement member.

6. The flexible electrophoretic display according to claim 1, wherein the electrophoretic layer includes a dielectric solvent and electriferous particles dispersed in the dielectric solvent.

7. The flexible electrophoretic display according to claim 1, wherein an interval between the display structure and the backside plate is in a range of 0.1 mm to 1 mm.

8. The flexible electrophoretic display according to claim 1, wherein the material of the backside plate is polyethylene terephthalate (PET), polystyrene (PS), or polycarbonate (PC).

9. The flexible electrophoretic display according to claim 1, wherein the material of the side reinforcement is plastic material.

10. The flexible electrophoretic display according to claim 9, wherein the plastic material is UV polymeric gel, silica gel, or polyurethane (PU).

11. The flexible electrophoretic display according to claim 1, further comprising a top cover and a bottom cover, wherein the top cover is disposed on the display structure and the side reinforcement, including an opening to expose a display area of the display structure, and the bottom cover is disposed beneath the backside plate.

12. A method for manufacturing a flexible electrophoretic display, comprising steps of:
   providing a display structure, comprising:
      providing a flexible plate,
      providing an electrophoretic layer disposed on a surface of the flexible plate;
      providing an edge protection member disposed on the surface of the flexible plate, surrounding the electrophoretic layer and directly connected with one side of the electrophoretic layer; and
      an edge reinforcement member disposed on and directly connected with the flexible plate, and directly connected with a side of the electrophoretic layer and the edge protection member;
   providing a backside plate disposed on a bottom surface of the flexible plate of the display structure, and the backside plate having a surface with a cover area larger than an area of the bottom surface; and
   providing a side reinforcement made of a material different from that of the backside plate and in juxtaposition with the display structure, which is separately formed with respect to the backside plate, directly disposed on the surface of the backside plate and connected with the surface of the backside plate and directly connected with a side of the display structure.

13. The method of manufacturing a flexible electrophoretic display according to claim 12, wherein the step of providing a display structure further comprises:
   providing a transparent protection layer disposed on the electrophoretic layer and connected with the edge reinforcement member.

14. The method of manufacturing a flexible electrophoretic display according to claim 12, further comprising:
   providing a driving integrated circuit (IC) disposed on a top surface of the flexible plate in juxtaposition with the electrophoretic layer and covered by the edge reinforcement member.

15. The method of manufacturing a flexible electrophoretic display according to claim 12, further comprising:
   providing a top cover disposed on the display structure and the side reinforcement on the bottom surface, and the top cover having an opening to expose a display area of the display structure; and
   providing a bottom cover disposed beneath the backside plate.

* * * * *